United States Patent [19]
Kim et al.

[11] Patent Number: 5,964,895
[45] Date of Patent: Oct. 12, 1999

[54] VRAM-BASED PARITY ENGINE FOR USE IN DISK ARRAY CONTROLLER

[75] Inventors: Jin-Pyo Kim; Joong-Bae Kim; Yong-Yun Kim; Kee-Wook Rim, all of Daejeon, Rep. of Korea

[73] Assignee: Electronics and Telecommunications Research Institute, Daejeon, Rep. of Korea

[21] Appl. No.: 08/866,801

[22] Filed: May 30, 1997

[30] Foreign Application Priority Data

Dec. 5, 1996 [KR] Rep. of Korea ................... 96-61992

[51] Int. Cl.$^6$ ............................................. G06F 13/00
[52] U.S. Cl. ........................................ 714/758; 711/100
[58] Field of Search ...................... 395/183.18, 842, 395/512; 364/900; 371/37.7; 348/601, 559, 564, 563; 714/801, 758, 701, 42; 711/100, 105

[56] References Cited

U.S. PATENT DOCUMENTS

| | | | |
|---|---|---|---|
| 4,642,789 | 2/1987 | Lavelle et al. | 364/900 |
| 4,642,794 | 2/1987 | Lavelle et al. | 364/900 |
| 4,646,261 | 2/1987 | Ng | 364/900 |
| 5,515,381 | 5/1996 | Chan | 371/37.7 |
| 5,539,479 | 7/1996 | Bertram | 348/564 |
| 5,548,340 | 8/1996 | Bertram | 348/559 |
| 5,604,544 | 2/1997 | Bertram | 348/601 |
| 5,682,522 | 10/1997 | Huang et al. | 395/512 |
| 5,748,983 | 5/1998 | Gulick et al. | 395/842 |
| 5,801,785 | 9/1998 | Crump et al. | 348/563 |

FOREIGN PATENT DOCUMENTS

| | | |
|---|---|---|
| 0 578 139 A2 | 1/1994 | European Pat. Off. . |
| 0 582 370 A2 | 2/1994 | European Pat. Off. . |
| 0 594 464 A2 | 4/1994 | European Pat. Off. . |

OTHER PUBLICATIONS

*A Case for Redundant Arrays of Inexpensive Disks (RAID)*, David A. Patterson, Garth Gibson and Randy H. Katz, (Patterson et al., ACM SIGMOD Conference, Chicago, II Jun. 1–3, 1988, pp. 109–116).

*Primary Examiner*—Dennis M. Butler
*Assistant Examiner*—Omar A. Omar
*Attorney, Agent, or Firm*—Cohen, Pontani, Lieberman & Pavane

[57] ABSTRACT

A VRAM-based parity engine for use in a disk array controller is disclosed, in which the parity arithmetic operation is carried out in a fast and effective manner, thereby improving the performance of the RAID system. Particularly, the parity data arithmetic operation is not resorted to a processor, but to a VRAM, thereby realizing a high speed operation. In the disk array controller, a VRAM (video RAM) is used, in such a manner that the reading, updating and writing are made to be overlapped during the arithmetic operation, thereby promoting the speed of the arithmetic. Therefore, a relatively large capacity memory can be formed compared with the conventional SRAM, and therefore, a temporary buffer memory within the parity engine is used as a parity cache, thereby doubling the performance.

2 Claims, 3 Drawing Sheets

VRAM-BASED PARITY ENGINE FOR USE IN DISK ARRAY CONTROLLER

BACKGROUND OF THE INVENTION

1. Field of the Invention

The present invention relates to a VRAM (video RAM)-based parity engine for use in a disk array controller, in which the parity arithmetic operation is carried out in a fast and effective manner, thereby improving the performance of the RAID system. Particularly, the present invention relates to a parity engine structure and a parity generation method, in which the parity data arithmetic operation is not resorted to a processor, but to a VRAM, thereby realizing a high speed operation.

2. Description of the Prior Art

In computer systems, the processing speed and reliability have been improved continuously. On the other hand, the performance of the disk storage device has been improved in slow steps compared with the main processing device, with the result that the performance difference between the two devices has been growing more and more. In order to reduce such a performance difference between the two devices, a disk array has been proposed.

In "Case for Redundant Arrays of Inexpensive Disks (RAID)" (Patterson et al., ACM SIGMOD Conference, Chicago, Ill., Jun. 1–3, 1988, pages 109–116), it was designated that the capacity of large scale disks is improved in a fast step, while the performance is improved in a slow step. In this treatise, it was proposed that inexpensive disks are formed into an array so as to use it as a large scale disk. Such redundant arrays of inexpensive disks (RAID) not only improves the performance, but also upgrades the reliability of the single large scale disk which was a conventional problem.

In a disk array controller which was devised by John G. McBride, a VRAM which is a dual-port memory is used as a buffer between a disk data path and the array controller, and provided with a counter, thereby giving a programmable capability (John G. McBride, Programmable Disk Drive Array Controller, European Patent Application No. 93110553.0, Jul. 01, 1993). In this array controller, the VRAM is used as a controllable speed matching buffer between the disk and the host interface of the array controller.

In a disk array controller and a disk array operation method which were devised by Robert A. DeMoss and Keith B. Dulac, there is used a bus switch having a parity arithmetic logic capability (Robert A. DeMoss and Keith B. Dulac, Method of operating a Data Storage Disk Array, European Patent Application No. 93308454.3, Oct. 22, 1993). In this array controller, the operation is executed always by reading the data and the parity block from the disk, and a fast parity arithmetic operation is possible on the data path by using a bus switch including a parity arithmetic logic, but the parity block cannot be cached.

In a disk controller which was devised by Dennis J. Alexander, Ryan A. Callison and Ralph S. Perry, there is carried out a parity arithmetic operation for the data which are read from a plurality of disks, by using a transfer controller and a transfer buffer RAM, while the writing performance is improved by using a posted write RAM (Deniss J. Alexander, Ryan A. Callison and Ralph S. Perry, Disk Drive Controller with a Posted Write Cache Memory, European Patent Application No. 93304372.1, Jun. 04, 1993).

In the disk array controllers of the prior art, a buffer or a parity arithmetic logic is provided on the data path, with the result that only a high speed parity arithmetic is possible, or only buffering is possible. As to the structure of the parity engine in the RAID controller of the prior art, there is internally installed a processor separately from the main processor of the controller. Therefore, either the processor carries out a parity arithmetic, or the temporary buffer which is required for carrying out the parity arithmetic includes an SRAM. As a result, the cost is high, but notwithstanding, the performance is inferior.

Further, in the case where the temporary buffer consists of an SRAM, when an XOR arithmetic is carried out for two blocks, first a block is read from the disk cache memory to store it, and then, another block of the SRAM is read, in order that an XOR arithmetic can be carried out for the two blocks. Then a writing has to be carried out into the memory. That is, in all, three accesses are necessary.

SUMMARY OF THE INVENTION

The present invention is intended to overcome the above described disadvantages of the conventional techniques.

Therefore it is an object of the present invention to provide a VRAM-based parity engine for use in a disk array controller, in which only two operations, i.e., an operation of reading a first block from a disk cache memory, and an operation of writing into a RAM of a VRAM, are carried out, so that the parity operation would be faster compared with the conventional methods.

This is possible because an SAM port and a RAM port of the VRAM can be simultaneously accessed, and therefore, the reading and writing are overlapped.

It is another object of the present invention to provide a VRAM-based parity engine for use in a disk array controller, in which a relatively large capacity memory can be formed compared with the SRAM, and therefore, a temporary buffer memory within the parity engine is used as a parity cache, thereby doubling the performance.

In achieving the above objects, the VRAM-based parity engine for use in a disk array controller according to the present invention includes:

a direct memory access (DMA) controller; a PCI bus interface connected to a disk cache memory section; the disk cache memory section being connected with a local bus of a PCI bus interface and a PCI bus and consisting of a DRAM controller, a DRAM, and a first transmitting/receiving buffer; and a parity engine connected to all the above components, the VRAM-based parity engine further includes:

a video memory control means for receiving control signals from the DMA controller to transmit data from the disk cache memory to a video memory and to generate various control signals necessary for operations of the video memory so as to realize a fast parity arithmetic; the video memory being for temporarily storing new parity arithmetic data computed in accordance with the control signals of the video memory control means;

a logic arithmetic means for computing an old parity data of the video memory and a new data of the disk cache memory under a control of the DMA controller; and a transmitting/receiving means for transmitting and receiving a data of the disk cache memory and parity arithmetic data of the logic arithmetic means and the video memory to and from the PCI bus interface.

That is, in the VRAM-based parity engine according to the present invention, a high speed parity arithmetic operation is possible by using dual ports of the VRAM, and a large capacity parity cache function is possible. Thus it has a possibility for a higher performance and expansion.

The parity engine is connected to a PCI bus interface circuit, and includes a video RAM, a VRAM controller, an exclusive logic arithmetic device, and a transmitting/receiving buffer.

The PCI bus matching circuit includes: various for carrying out the operations based on the PCI rules; and circuits for converting signals, while it holds also PCI bus master-slave functions.

The DMA controller carries out a role of transmitting data from the disk cache memory to the video RAM of the parity engine or vice versa, and a role of executing an exclusive logic summing operation.

The video RAM includes a RAM (random access memory) and SAM (serial access memory), and is a dual-port memory accessible from two sides.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
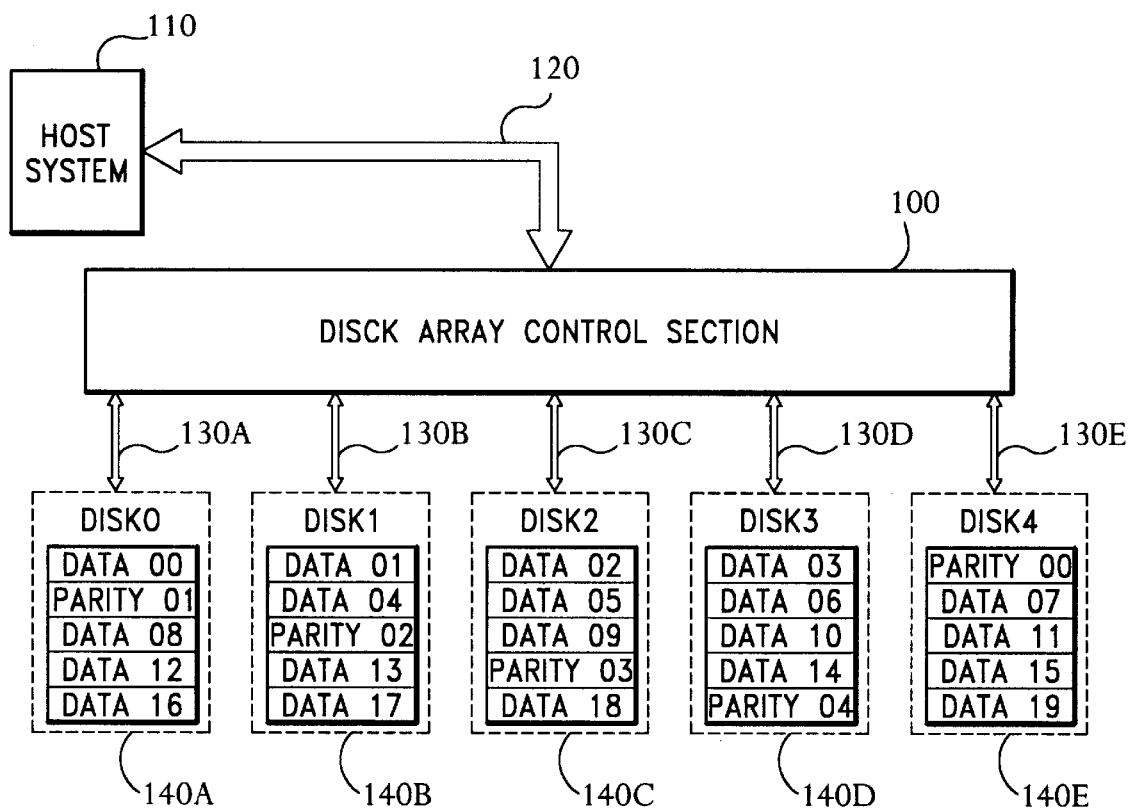
FIG. 1 illustrates the layout of the data and parity blocks operated with a RAID level 5 according to the present invention.

FIG. 1 illustrates the layout of the data and parity blocks operated with a RAID level 5 according to the present invention;

FIG. 1 contains: a host system 110, a host input/output bus 120, a disk array control section 100, a plurality of disk input/output buses 130A, 130B, 130C, 130D and 130E, and a plurality of disk bus drives 140A, 140B, 140C, 140D and 140E.

In FIG. 1, DATA 00, DATA 01, . . . , DATA 19 indicate pure data blocks, while Parity 00, Parity 01, . . . Parity 04 indicate parity blocks. The parity block Parity 00 is related to the data blocks DATA 00, DATA 01, DATA 02 and DATA 03, while the parity block Parity 01 is related to the data blocks DATA 04, DATA 05, DATA 06 AND DATA 07. Thus P3, P4 and P5 also store parities for the data blocks of the respective rows.

However, at the RAID level 5, the parity data have to be updated when writing the data into the disk. New parity data are derived by carrying out an exclusive logic OR on the new data, on the old data and on the old parity. If a lowering of the performance of the system is to be prevented, the above arithmetic has to be executed in a fast and efficient manner.

Figure 2:
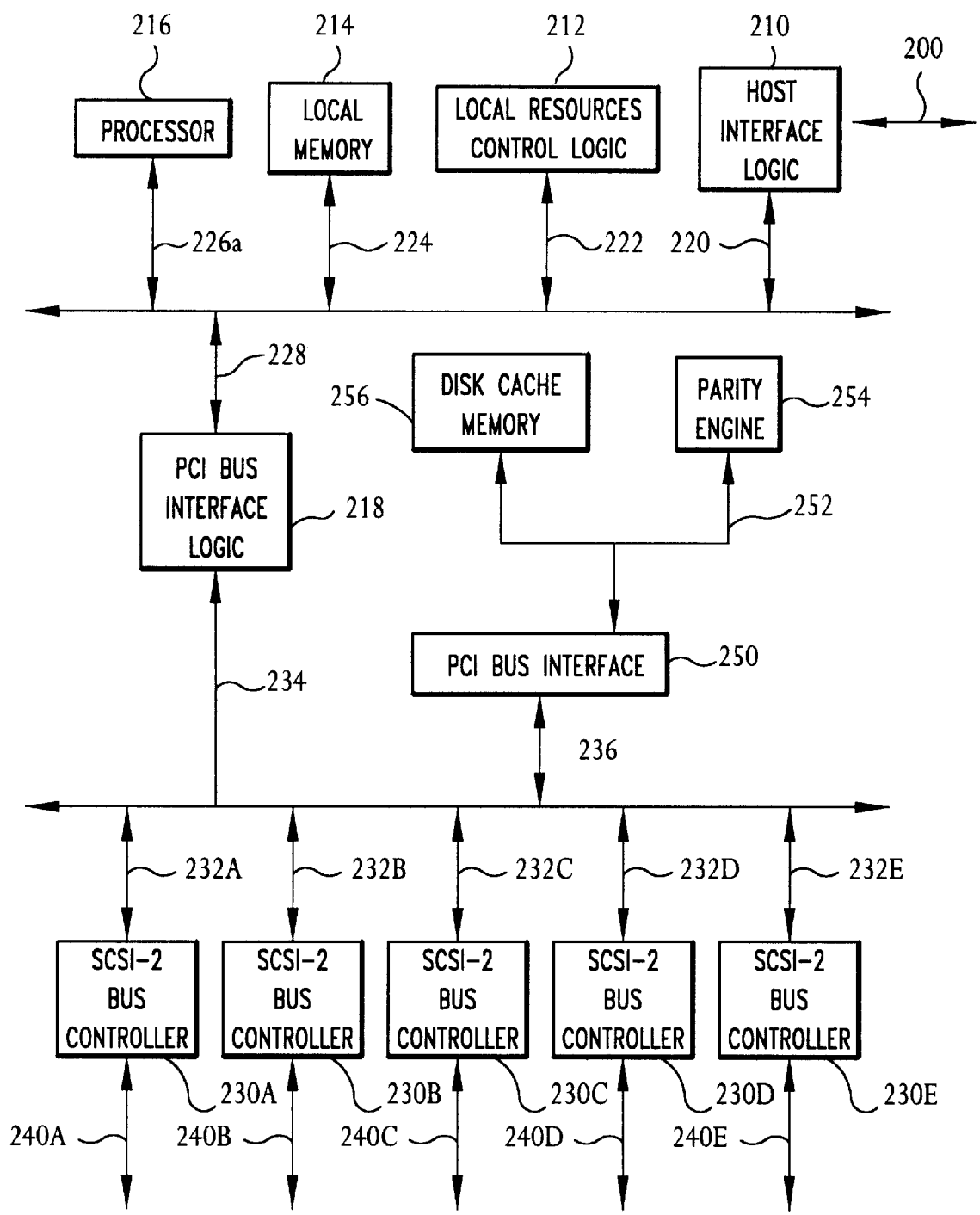
FIG. 2 is a block diagram showing the constitution of the disk array controller of FIG. 1.

FIG. 2 is a block diagram showing the constitution of the general disk array controller.

The disk array controller of FIG. 2 includes: a processor 216; a local memory 214; a local resource control logic 212; a host interface logic 210; a PCI interface logic 218; a local bus 226 for connecting the local resources and addresses of all the above components to control signals 226a, 224, 222, 220 and 228; SCSI buses 230A, 230B, 230C, 230D and 230E connected to a PCI bus 236 connected to 232A, 232B, 232C, 232D and 232E; a disk cache memory section 256; a parity engine 254; a PCI bus interface 250; and a bus 252 connected between the PCI bus interface 250 and the disk cache memory 256 and the parity engine 254.

The parity engine which is presented in the present invention can be used in the general RAID controller shown in FIG. 2. The parity engine can improve the performance of the RAID system by carrying out the parity arithmetic in a fast and efficient manner.

Figure 3:
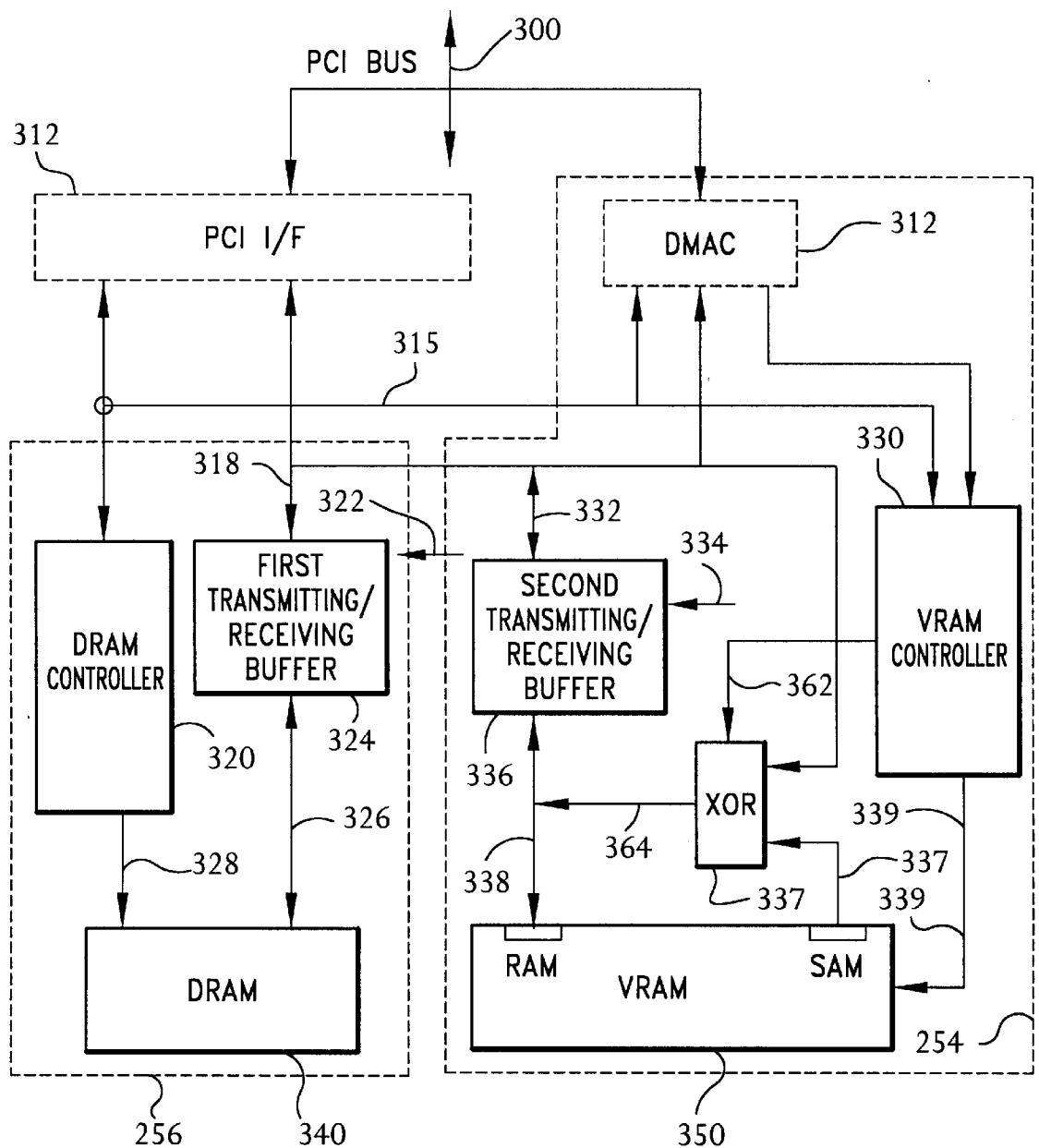
FIG. 3 illustrates the constitution of the disk cache memory and parity engine.

In FIG. 3, there are included a disk cache memory section 256, a PCI bus interface 312, and a parity engine 254 including a DMA controller 314.

The PCI bus matching circuit 312 includes: various control and status registers for enabling various operations in accordance with the PCI bus rules; and a circuit for converting signals. Further, the circuit 312 holds the master-slave functions for the PCI bus 300.

The DMA controller 314 transmits data from the DRAM 340 of the disk cache memory 256 to the video RAM 350 of the parity engine 254, and makes the exclusive or logic (XOR) 360 carry out arithmetic operations.

The parity engine 254 includes: a DMA controller 314, a video RAM controller 330, a video RAM 350, an exclusive or logic 360, and a second transmitting/receiving section 336.

The video RAM 350 includes a RAM and a SAM, and is a dual-port memory which is accessible from two sides.

In the present invention, a VRAM is used as a temporary storage when carrying out a parity arithmetic, and is used as a parity cache. The VRAM controller 330 performs a role of generating various signals 339 which are necessary for the operation of the VRAM 350.

The exclusive or logic 360 is a buffer logic in which an XOR for each bit is carried out on a data 337 from the SAM port of the VRAM 350, and on a data 318 from DRAM 340 through first transmitting/receiving buffer 324 controlled by DMA controller 314.

The disk cache memory section 256 is connected to both the PCI bus interface and to the DMA controller, and includes a DRAM controller 320, a DRAM 340 and a first transmitting/receiving buffer 324.

For the present invention constituted as above, and example will be described.

First, the RAID system dispersedly stores the data in a plurality of separate disks, so that the disks would serve like a large single disk. Thus a disk array system is formed in which a high performance large capacity storage system is realized. However, in the disk array, a large amount of data is dispersedly stored in a plurality of disks, and therefore, if one of the disks is put to a disorder, the total data of the system is damaged, with the result that the remedying becomes impossible.

In order to solve this problem in the RAID system, there is provided a data mirroring, an ECC code, or a parity data, thereby making it possible to remedy the damaged data.

In accordance with the error correcting method and how to distribute the parity data over disks, it is broken down into various RAID levels. Among them, the RAID level 5 in which the parity data are stored in a plurality of disks is widely used.

In the RAID level 5, when writing a data into the disks, the parity has to be always updated. The new parity data can be derived by carrying out an exclusive OR on the new data, the old data and the old parity data. The system performance deterioration can be prevented by only carrying out the exclusive OR arithmetic in a fast and efficient manner. The present invention provides a parity engine structure which is capable of carrying out the parity arithmetic in a fast and efficient manner, thereby improving the performance of the RAID system.

The RAID controller which has received a command of writing a data into the disks stores the new data into the disk cache memory, and inspects the disk cache and the parity cache to check as to whether an old data and an old parity exist within the cache. If it is in a cache miss state, the cache memory is read from the disks, while if it is in a cache hit state, only the block starting address is confirmed. The new parity is derived based on the new data, the old data and the old parity through an exclusive OR which is defined as follows.

$$\text{New parity} = \text{new data} \oplus \text{old data} \oplus \text{old parity} \quad (1)$$

Therefore, the XOR operations are sequentially carried out for the three data blocks.

If the three data blocks which are required for the parity computation are found in the disk cache memory or in the buffer memory, then the RAID controller writes the beginning address of the new data block and the size of the block into a DMA controller register of the parity engine, and activates the DMA controller.

The DMA controller 314 which has received a command moves an old parity into the parity cache (VRAM) 350 through the first transmitting/receiving buffer 324, and carries out a control so that an exclusive logic arithmetic would be carried out on the old parity and a new data 337 of the disk cache memory 256 by the exclusive or logic 360. Then the DMA controller stores the result of the exclusive or through the RAM port within the parity cache (VRAM) 350. In order to do this, first the DMA controller 314 requests for a read transfer operation 316 to the VRAM controller 330 and at the same time, enables (362) the output of the exclusive summing logic (XOR) 360, while the contents of the second transmitting/receiving buffer 336 is disabled.

The read transfer operation is a pre-operation for reading the data from the SAM port of the VRAM 350, and therefore, if a clock signal is supplied to an SC (serial clock) terminal of the VRAM, the data in the incremented address can be read continuously.

When the read transfer operation is completed, the DMA controller 314 reads a first word of the new data block of the disk cache memory 256 to carry out a writing operation into the RAM port of the VRAM 350. Under this condition, the data which are written into the VRAM 350 are the result of carrying out an XOR on the data of the disk cache memory 256 and data of the SAM port of the VRAM 350.

When one cycle of operation of reading from the disk cache memory 256 and writing into the VRAM is completed, the address of the disk cache memory and the address of the VRAM are incremented as much as one word, while the block size counter is decremented as much as one word.

Further, a clock signal is supplied also to the SC terminal of the VRAM, so that the data in the incremented address can be read out. Thereafter, the DMA controller repeats the writing from the disk cache memory to the RAM port of the VRAM 350 by utilizing the incremented address, until the block size counter shows 0. As a result, the old parity block of the VRAM is updated by being XORed together with the new data block of the disk cache memory.

This data and the last old data block are subjected to an XOR in the same way, and finally a new parity is left in the VRAM as a result of XORing the three data. When the total task is completed, the DMA controller sends an interrupt to the RAID controller to notify that the task has been completed.

According to the present invention as described above, the parity engine is provided with a temporary parity arithmetic buffer as a VRAM. Consequently, the parity can be computed in a fast and efficient manner compared with the conventional methods.

What is claimed is:

1. A video random access memory based parity engine connected to a PCI bus interface and a disk cache memory, said parity engine comprising:

a video memory;

a direct memory access controller connected to said PCI bus interface for providing control signals to DRAM controller, VRAM controller XOR logic and buffers in order to controll transmission and receipt of data between said disk cache memory and said video memory, and for providing control signals to DRAM controller, VRAM controller XOR logic and buffers in order to get parity data;

a video memory controller for receiving the control signals from said direct memory access controller to transmit data from said disk cache memory to said video memory and generating control signal for operating said video memory;

an arithmetic logic means for calculating old parity data of said video memory and new parity data of said disk cache memory under control of said direct memory access controller, wherein said video memory temporarily stores the new parity data in accordance with the control signals from said video memory controller; and a transmitting/receiving means for transmitting and receiving data from said disk cache memory, the new parity data from said arithmetic logic means, said video memory and said PCI bus interface.

2. The video random access memory based parity engine in accordance with claim 1, wherein said video memory provides a parity cache so as to reduce access to a disk during arithmetic operations when the old data and the old parity data are stored in said disk cache memory, and so as to reduce retransmissions from said video random access memory to said disk cache memory, after reading the old parity block from said disk cache memory to said video random access memory and after carrying out the arithmetic logic operations.

* * * * *